United States Patent [19]

Iwafune

[11] Patent Number: 4,488,050
[45] Date of Patent: Dec. 11, 1984

[54] LEVEL MEASURING INSTRUMENT HAVING A STAFF WITH LIGHT-EMITTING ELEMENTS

[75] Inventor: Yasuo Iwafune, Tokyo, Japan

[73] Assignee: Tokyo Kogaku Kikai Kabushiki, Tokyo, Japan

[21] Appl. No.: 368,009

[22] Filed: Apr. 13, 1982

[30] Foreign Application Priority Data

Apr. 16, 1981 [JP] Japan .................................. 56-57749

[51] Int. Cl.³ ...................... G01B 11/27; G01C 15/06
[52] U.S. Cl. ................................... 250/578; 356/152; 356/400; 33/293
[58] Field of Search .................... 356/400, 401, 4, 152; 455/603, 604, 613, 617; 33/292, 293, 294; 340/815.03, 815.04; 358/107; 250/239, 209, 578

[56] References Cited

U.S. PATENT DOCUMENTS

| | | | |
|---|---|---|---|
| 3,330,955 | 7/1967 | Barecki et al. | 455/617 X |
| 3,790,277 | 2/1974 | Hogan | 356/400 X |
| 3,857,639 | 12/1974 | Mason | 250/239 X |
| 3,972,622 | 8/1976 | Mason et al. | 356/400 |

Primary Examiner—Edward P. Westin
Attorney, Agent, or Firm—Brumbaugh, Graves, Donohue & Raymond

[57] ABSTRACT

A level measuring instrument including a staff having a plurality of light emitting diodes located along the length of the staff with predetermined spacings. The light emitting diodes produces coded lights which are distinguishable with each other. The instrument further includes a light receiving optical system and an electrical system which discriminates a particular diode which has produced the light as received by the optical system.

7 Claims, 7 Drawing Figures

FIG. 2

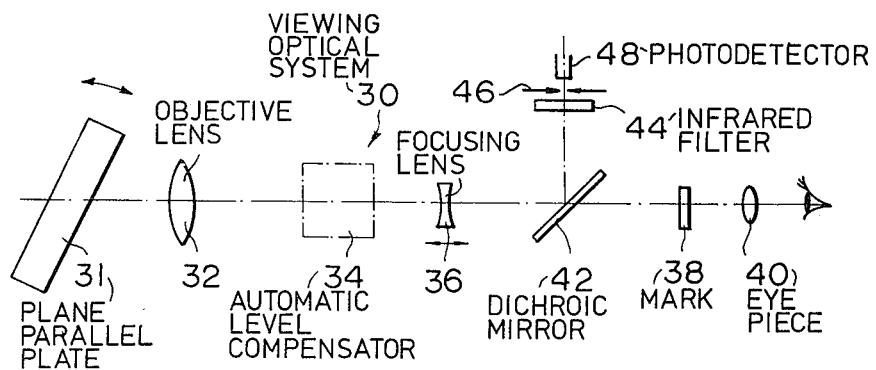
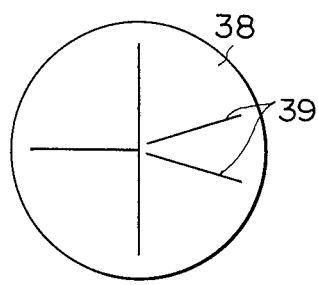
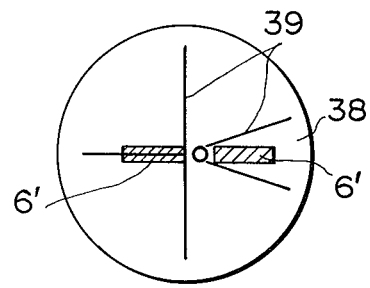
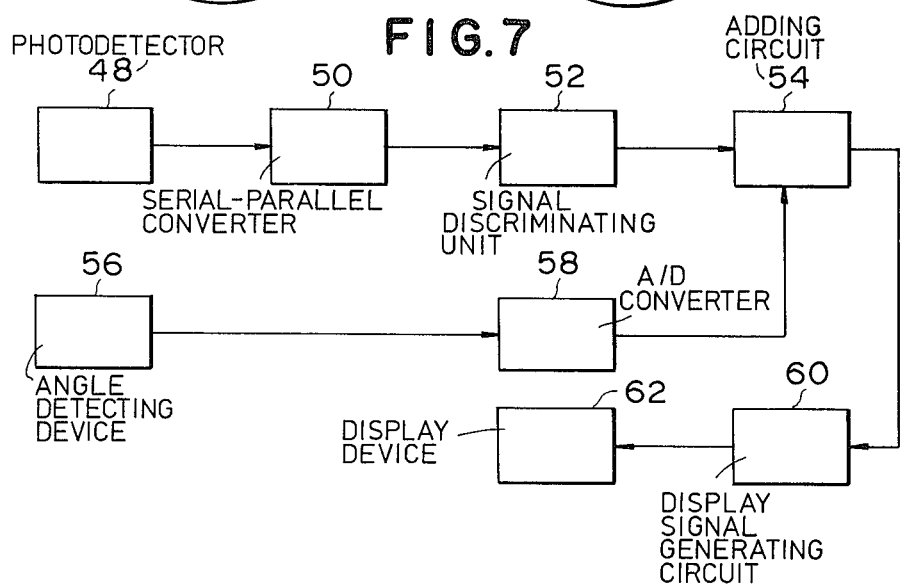

LEVEL MEASURING INSTRUMENT HAVING A STAFF WITH LIGHT-EMITTING ELEMENTS

The present invention relates to an instrument for use in a plane survey. More particularly, the present invention pertains to a staff and a leveling instrument for a plane survey.

Conventionally, a plane survey has been carried out by using a staff having a scale provided thereon and a leveling instrument for viewing the staff located at a distant point. In such conventional plane survey, problems have been encountered in that errors are likely to occur in reading the scale on the staff. It is therefore desirable to provide a surveying instrument in which the scale reading can automatically been performed. Thus, it has already been proposed to project a laser beam in a horizontal direction and detect the beam on the staff. However, in such known apparatus, a bulky system is required in providing a power source for the laser. Thus, the apparatus is inconvenient for outdoor use. Further, in this apparatus, the diameter of the laser beam as projected on the staff is large so that a precise measurement cannot be ensured. It should further be pointed out that the known apparatus is inconvenient in that the scales on the staff cannot be visually read.

It is therefore an object of the present invention to provide an instrument for a plane survey in which the scales on the staff can be precisely and automatically read.

Another object of the present invention is to provide a staff for a plane survey which is suitable for automatic scale reading.

A further object of the present invention is to provide a staff which has visually readable scale and means for enabling automatic reading.

According to the present invention, the above and other objects can be accomplished by a measuring instrument including a staff having a plurality of light emitting elements located on and along length of said staff at predetermined spacings, means for energizing said light emitting elements so that respective elements produce lights containing mutually distinguisable signals. In a preferable aspect of the present invention, the staff is further provided with visual marks located beside said light emitting elements.

According to a further features of the present invention, there is also provided a measuring instrument including staff means comprised of a staff having a plurality of light emitting elements located on and along the length of said staff at predetermined spacings and means for energizing said light emitting elements so that respective elements produce lights containing mutually distinguisable signals; measuring optical means for receiving the light from said staff means; electrical means including light receiving means for receiving light from said optical means and converting it into an electrical signal, and discriminating means for discriminating the electrical signal to thereby judge the particular one of the light emitting elements from which the light as received and converted into the electrical signal has been produced.

The above and other objects and features of the present invention will become apparent from the following descriptions of a preferred embodiment taking reference to the accompanying drawings, in which:

FIG. 4 is a diagrammatical illustration of the optical system of a leveling instrument in accordance with one embodiment of the present invention;

FIG. 5 is a view showing one example of the pattern of the mark used in the optical system shown in FIG. 4;

FIG. 6 shows the mark with an image of the mark on the staff formed thereon; and, FIG. 7 is a block diagram of the electrical circuit in the leveling instrument.

Figure 1:
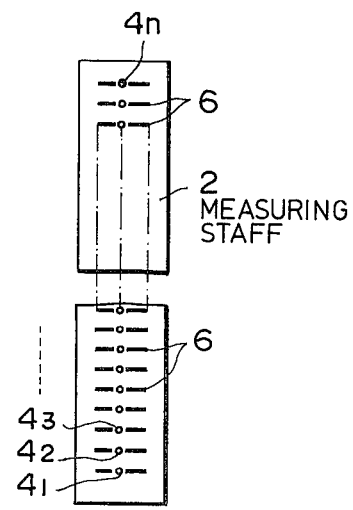
FIG. 1 is a partially cut-away front view of a staff in accordance with one embodiment of the present invention.
Figure 2:
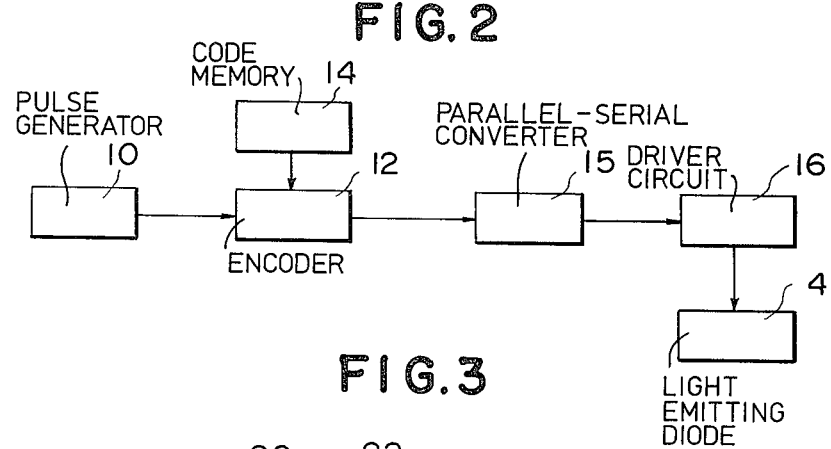
FIG. 2 is a block diagram of the light emitting diode energizing circuit.

Referring now to the drawings, particularly to FIG. 1, there is shown a measuring staff 2 which has infrared light emitting diodes $4_1, 4_2, 4_3 --- 4_n$ located in a row along the length of the staff 2 at equal spacings of, for example, 1 cm. At the opposite sides of each of the diodes, there are provided a pair of viewing marks 6 as shown. As shown in FIG. 2, the staff 2 is associated with an energizing circuit for energizing the light emitting diodes 4. The circuit includes a pulse generator 10 which produces pulses of predetermined intervals and applied them to an encoder 12. The encoder 12 is associated with a code memory 14 which contains memories of pulse patterns corresponding to respective ones of the diodes. The encoder 12 thus receives the memories of the pulse patterns from the code memory and produces coded signals respectively correponding to the diodes 4. The coded signals from the encoder 12 are applied to a P-S (parallel-serial) converter 15 which converts the incoming information comprised of a plurality of bit signal into a coded signals of which the level changes as the time passes. The coded signal from the P-S converter 15 is applied to a driver circuit 16 which produces an output in accordance with the coded signal for energizing each diode 4 to thereby produce a light including a specific signal.

Figure 3:
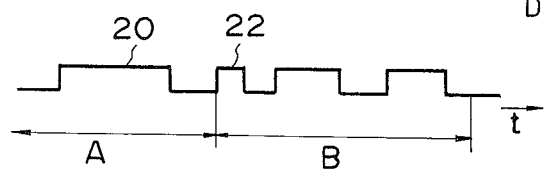
FIG. 3 is a diagram showing one example of the waveform of the light produced by the diode.

FIG. 3 shows one example of the coded light 20 produced by the light emitting diode 4. The coded light 20 includes a pulse section A which provides a reference signal for determining the start of the coded light, and a pulse section B which contains the signal code. The first bit 22 of the coded signal can therefore be located by the pulse section A so that the pulse section B does not contain the same bit as in the section A.

Referring now to FIG. 4, the leveling instrument contains a viewing optical system 30 which comprises a plane parallel plate 31, an objective lens 32, an automatic level compensator 34, a focusing lens 36, a mark 38 and an eye piece 40 which are arranged in this order along an optical axis. The level compensator 34 is provided to make it possible to direct the axis of sight always horizontally even when the instrument is not fixed in an accurate orientation. Such compensator has been well known in the art and reference may be made to Japanese patent publication No. 39-30338 published on Dec. 26, 1964.

The mark 38 has a pattern 39 as shown in FIG. 5. Between the focusing lens 36 and the mark 38, there is provided a dichroic mirror 42 which is slanted with respect to the optical axis so as to reflect infrared rays. Along the reflecting axis of the mirror 42, there are provided an infrared filter 44, an aperture 46 and a photodetector 48. The infrared filter 44 functions to pass only the infrared light as generated by the diodes 4. The aperture 46 serves to pass only the beam of light which has been generated by one diode 4 to the photodetector 48 so that it has a diameter smaller than the spacing of the images of the diodes 4 as produced when the staff 2 is located at the furthermost position, for example, 100 m from the leveling instrument. The aperture 46 is conjugate with the mark 38. The plane parallel plate 31 is rotatable about a horizontal axis perpendicularly crossing the optical axis. The angular position of the plate 31 can be electrically detected by an angle detecting device 56 which is shown in FIG. 7.

In operation, the staff 2 is placed at the measuring point and the leveling instrument is properly set. The plane parallel plate 31 is rotated until the images 6' of the visual marks 6 on the staff 2 are located with respect to the mark pattern 39 on the mark plate 38. The angular position of the plane parallel plate 31 is electrically detected to determine fine values of measurement which is smaller than the spacing of the diodes 4. When the plane parallel plate 31 is properly set, the beam of light from one of the diodes 4 passes through the aperture 46 to the photodetector 48. The photodetector 48 has an output connected with a S-P (serial-parallel) converter 50 which is in turn connected with a signal discriminating circuit 52. The output of the signal discriminating circuit 52 is connected with an adding circuit 54.

The angle detecting device 56 for detecting the angular position of the plane parallel plate 31 has an output connected with an A/D converter 58 which is in turn connected with the adding circuit 54. The output of the adding circuit 54 is applied to a display signal generating circuit 60 which function to provide an appropriate display in a display device 62.

The photodetector 48 produces a serial signal in accordance with the incoming beam of light and the serial signal is applied to the S-P converter 50 so as to be converted into a parallel signal. The discriminating circuit 52 receives the parallel signal and discriminates a particular diode from which the light is received by the photodetector 48 is produced. The discriminating circuit 52 produces an output corresponding to the level of the discriminated diode and applies it to the adding circuit 54. The output of the discriminating circuit 52 is added with the output of the A/D converter 58 which represents the angular position of the plane parallel plate 31. The output of the adding circuit 54 therefore represents the result of measurement which is displayed on the display device 62.

The invention has thus been shown and described with reference to a specific embodiment, however, it should be noted that the invention is in no way limited to the details of the illustrated arrangements but changes and modifications may be made without departing from the scope of the appended claims.

I claim:

1. A staff for use in a level measuring system including an instrument having a horizontal optical axis, the staff comprising an elongated body, a plurality of light emitting elements located on and along length of said body at positions corresponding to graduations located at predetermined spacings, and means for energizing said light emitting elements so that the respective elements produce light signals indicative of the corresponding graduations which are mutually distinguishable by the instrument.

2. A staff in accordance with claim 1 which is further provided with visual marks located beside said light emitting elements.

3. A level measuring system comprising staff means including a staff having a plurality of light emitting elements located on and along length of said staff at positions corresponding to graduations located at predetermined spacings, means for energizing said light emitting elements so that the respective elements produce light signals indicative of the corresponding graduations which are mutually distinguishable; measuring optical means for receiving the light from said staff means; electrical means including light receiving means for receiving light from said optical means and converting it into an electrical signal, and discriminating means for discriminating the electrical signal to thereby identify the particular one of the light emitting elements from which the light as received and converted into the electrical signal has been produced.

4. A level measuring system in accordance with claim 3 in which the staff is further provided with visual marks located beside said light emitting elements.

5. A level measuring system in accordance with claim 4 in which said optical means includes a sighting mark for sighting said visual marks on said staff.

6. A level measuring system in accordance with claim 3 in which said optical means includes means for fine adjustment of the direction from which light is received from the staff.

7. A level measuring system in accordance with claim 6 in which said fine adjustment means is a plane parallel plate rotatable about a horizontal axis.

* * * * *